United States Patent [19]

Flachbart et al.

[11] Patent Number: 5,631,058

[45] Date of Patent: May 20, 1997

[54] HIGH THROUGHPUT MANUFACTURING OF THIN FILM DATA RECORDING DISKS

[75] Inventors: Richard H. Flachbart, Salinas, Calif.; Albert P. Lee, Poughkeepsie, N.Y.; Stafford Miller, Gilroy, Calif.; Chester C. Oldakowski, Morgan Hill, Calif.; Swie-In Tan, San Jose, Calif.

[73] Assignee: International Business Machines Corporation, Armonk, N.Y.

[21] Appl. No.: 929,194

[22] Filed: Aug. 12, 1992

[51] Int. Cl.$^6$ .................................................. G11B 5/66
[52] U.S. Cl. .................... 428/64.2; 428/65.3; 428/65.5; 428/65.6; 428/694 T; 428/694 TP; 428/694 SG; 428/900; 360/135; 369/282; 369/283
[58] Field of Search .................. 428/64.2, 65.3, 428/65.5, 65.6, 694 T, 694 TP, 694 SG, 900; 360/135; 369/282, 283

[56] References Cited

U.S. PATENT DOCUMENTS

| 4,711,115 | 12/1987 | Sukonnik et al. | 72/329 |
|---|---|---|---|
| 4,870,524 | 9/1989 | Coe | 360/135 |
| 4,887,179 | 12/1989 | Coe | 360/135 |
| 5,063,120 | 11/1991 | Edmonson et al. | 428/694 BU |

FOREIGN PATENT DOCUMENTS

| 63-229623 | 9/1988 | Japan . |
|---|---|---|
| 63-229624 | 9/1988 | Japan . |
| 02168426 | 6/1990 | Japan . |
| 02304716 | 12/1990 | Japan . |
| 5-181662 | 4/1993 | Japan . |
| 6-12663 | 1/1994 | Japan . |

*Primary Examiner*—Leszek Kiliman
*Attorney, Agent, or Firm*—Thomas R. Berthold; James C. Wilson; Noreen A. Krall

[57] ABSTRACT

According to the present invention, a blank of an aluminum alloy is partially cut so as to form several disks maintained in the blank by portions of the remaining uncut aluminum. This results in the disks being supported in the blank during formation of the thin films, yet easily separated from the blank into individual disks after the thin films have been deposited. Therefore, multiple disks can be processed during a single manufacturing step.

5 Claims, 2 Drawing Sheets

HIGH THROUGHPUT MANUFACTURING OF THIN FILM DATA RECORDING DISKS

This invention relates generally to the manufacture of rigid magnetic recording disks and specifically to a method and apparatus for producing several thin film magnetic recording disks from a single substrate.

BACKGROUND OF THE INVENTION

There is a trend in the magnetic recording disk industry toward the fabrication of ever smaller disks. Disks with diameters as large as 355 mm. used to represent a large portion of the industry's production, but now manufacturers are producing disks as small as 48 or 34 mm. There are several reasons for this trend toward smaller disks. One reason is that smaller disks provide better data access times. A disk with a smaller diameter decreases the distance that a read/write head has to travel to access data. Therefore, the head reaches the data sooner and access time is reduced. Improved access time is also achieved with smaller disks because they can accommodate smaller and lighter actuator arms. Less massive actuator arms result in faster acceleration of the read/write head and faster data access.

The trend toward smaller disks is also driven by the demand for smaller and lighter portable computers. Smaller disks are well suited for applications such as notebook computers where weight and power consumption are critical design factors. As the demand for computer portability increases, so will the demand for ever smaller disks.

The ability of manufacturers to market these smaller disks is, in large part, a result of improvements in the magnetic coatings on the disks. Improved magnetic coatings now allow manufacturers to achieve much higher areal recording densities than previously available. That is, more information can now be stored on a given surface area of a disk. This improvement makes it possible for useful amounts of data to be stored on smaller disks.

The increased demand for smaller disks has created several problems for modern disk manufacturing facilities. One of these is the limitation on manufacturing throughput associated with the fabrication of small disks. As will become apparent from the following discussion, the throughput of many of the processes involved in disk fabrication declines as the diameter of the manufactured disk is reduced.

The fabrication of magnetic disks requires several thin films to be formed on the top and bottom surfaces of the disk. The conventional method of creating these thin films is to sputter deposit them on the surfaces of the disk. Two general categories of sputtering tools can be used to apply these films. The first, and most commonly used, category of tools are the single-disk tools, in which a single thin film layer is sputtered onto a single disk. The disk is then transferred to other single-disk sputtering tools for the deposition of subsequent layers. The second category of sputtering tools are known as pass-through tools or inline systems. In this type of tool, several disks are mounted on a pallet and passed through several coupled sputtering chambers while the required thin films are deposited.

The fabrication of disks using single-disk tools can be very time consuming. For each disk to be processed, several steps must occur. The disk must be placed in the sputtering tool; a vacuum must be created in the sputtering chamber; the disk must be kept in the chamber long enough for the required film thickness to be sputter-deposited; and finally, the disk must be removed from the chamber. This type of processing limits the throughput of the sputtering operation since only a single disk may be processed at a time. The processing time required is essentially the same regardless of the size of the disk being processed. Therefore, if throughput is measured in terms of the square centimeters of storage area created per hour, it is clear that the fabrication of smaller disks causes a decrease in the throughput of a disk manufacturing facility.

One way of addressing the throughput problems associated with single-disk tools is to utilize a pass-through system like those previously described. However, such an approach leads to several difficulties. Problems associated with this approach include the difficulty of suspending several disks in a pallet while both sides of the disk are exposed to the sputtering operation. Often the pallet shadows the disks and results in a nonuniform coating on the disk. In addition, the pallet itself becomes coated with the material that is being sputter deposited. This causes the pallet to become a source of contamination which must be frequently cleaned. The cleaning process is time consuming, costly, and can cause excessive tool downtime.

The present invention solves the above described throughput problems of the single-disk tools while avoiding the difficulties associated with the pass-through systems. In addition, the present invention can be adapted for use in a pass-through tool while avoiding the above described problems typically associated with such tools.

SUMMARY OF THE INVENTION

The present invention provides a method of processing several magnetic disks simultaneously that can be adapted to conventional single-disk manufacturing tools or sophisticated pass-through systems. The invention is a process for manufacturing sputter-deposited thin film magnetic recording disks, especially those of relatively small diameter, and a new disk blank containing multiple disks ready to be separated from the blank following the deposition of all required thin films. In the present invention a blank of substrate material, typically an aluminum alloy, is partially cut so as to form several disks maintained in the blank by portions of the remaining uncut substrate. This results in a structure that allows the disks to be supported in the blank during processing, yet easily separated into individual disks when desired. Therefore, several disks can be processed during a single manufacturing step.

In one embodiment of the invention the aluminum blank is in the shape of a disk; with a plurality of smaller disks maintained within the blank. For example, several 48 mm. disks are formed on a blank the size of a standard 130 mm. disk. The diameter of the blank is chosen to correspond to that of standard disks previously fabricated in the manufacturing line. This allows standard commercially available sputtering equipment and disk carriers to be utilized. In another embodiment of the invention, the blank replaces the pallet in a pass-through system. Instead of suspending several individual disks in a pallet and sputter depositing the thin films, a blank in the general shape of the pallet is conveyed through the pass-through system. This approach avoids the previously described handling, contamination, and shadowing problems associated with pass-through systems.

This invention thus increases the throughput of a magnetic disk fabrication facility, allows several magnetic disks to be processed simultaneously in a single-disk tool, eliminates the shadowing, contamination, and handling problems associated with the use of pallets in a pass-through system, and eliminates the pallet cleaning step of the pass-through process.

Further objects, features and advantages of the invention will become apparent from the following specification and the accompanying drawings.

DETAILED DESCRIPTION OF THE PREFERRED EMBODIMENTS

Figure 1A:
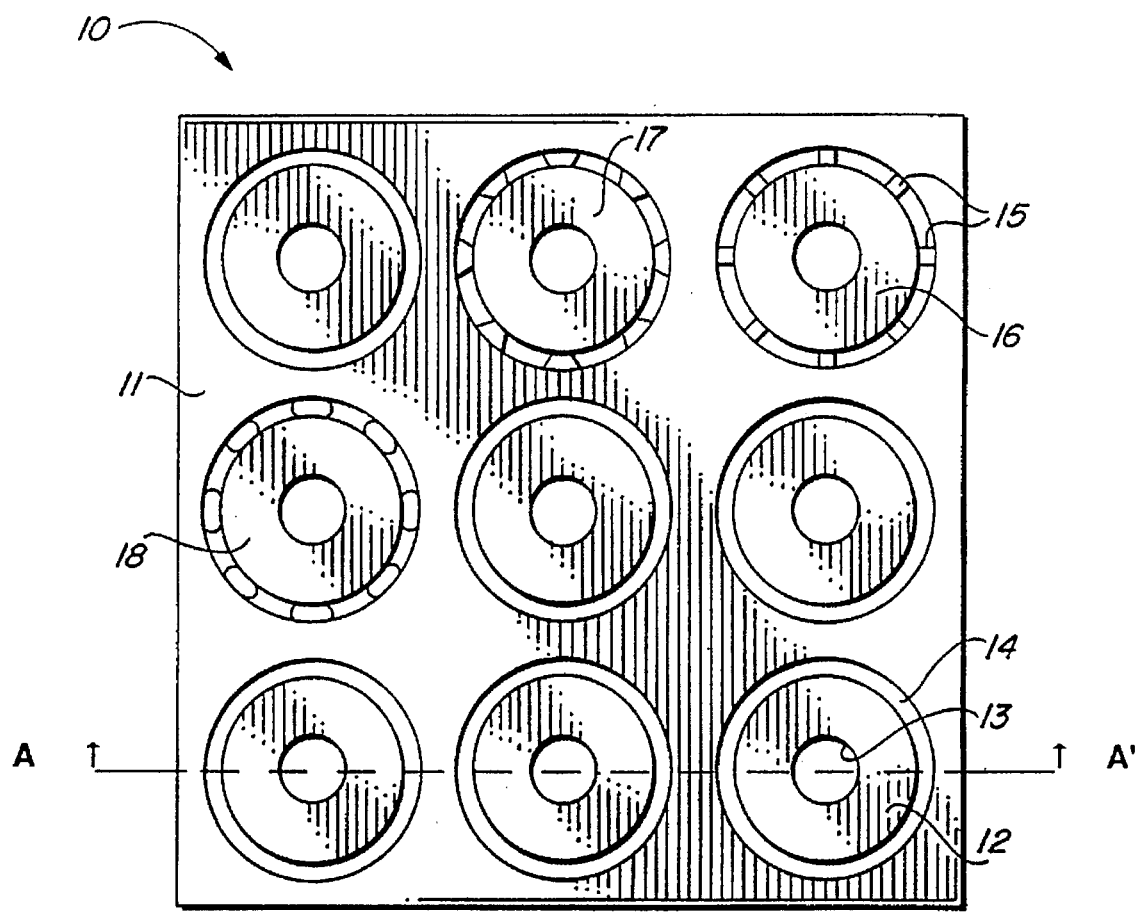
FIG. 1A is a plan view of one embodiment of an aluminum blank according to the present invention.
Figure 1B:
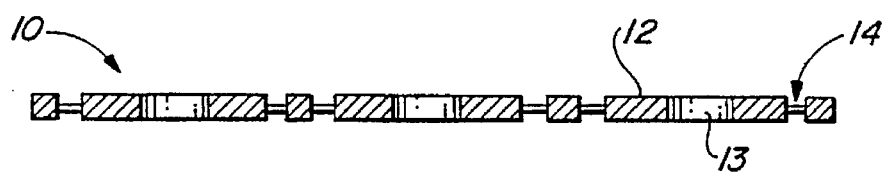
FIG. 1B is a cross-sectional view of the blank taken along section line A–A' of FIG. 1A.

With reference to FIGS. 1A and 1B, a rectangular blank 10 according to the present invention is formed from an aluminum substrate 11 in which a plurality of disks have been formed. Typically the substrate 11 is an aluminum-magnesium (AlMg) alloy. The rectangular blank 10 replaces the pallet used in typical pass-through sputtering tools. Instead of moving a pallet and its associated disks through the tool, the blank 10 with its integrated disks is passed through the tool. The use of a blank in this way eliminates the disk handling and pallet cleaning problems otherwise associated with pass-through tools.

The first step in the disk fabrication process of this invention is preferably the creation of circular openings 13 in the blank 10. These openings define the center of each disk to be formed and serve as a physical reference for subsequent operations. The outer perimeters of the disks can be formed by several different processes. For example, the entire outer perimeter 14 of a disk 12 can be cut to a specified depth so as to leave only a fraction of the original substrate thickness holding the disk to the blank 10. A preferred variation of this process is to cut the substrate 11 from both sides, resulting in a blank as shown in FIG. 1B. This method has the advantage of keeping the stresses created by the eventual separation of the disks from the blank away from the fragile magnetic layers on the top and bottom surfaces of the disk.

An alternative method of forming the disks is represented by disk 16 of FIG. 1A. Portions of the perimeter of the disk 16 are completely cut through, leaving sections 15 of the perimeter remaining so as to maintain a link or bridge between the blank 10 and the disk 16. The size and number of these remaining sections must be large enough to maintain the disks in the blank 10 during normal processing steps yet small enough to allow the disks to be easily separated from the blank. To further enhance the ease of separation, the remaining sections can be cut so as to be thinner than the substrate 11. For an aluminum substrate having a thickness of 0.6 mm., four remaining sections having a width of 0.5 to 1 mm. and a thickness of 0.075 to 0.125 mm. would be practicable.

Other alternatives are depicted by disks 17 and 18 which illustrate variations of the general technique used with disk 16. That is, the perimeter of the disk is completely cut through in some portions while other bridging portions remain to maintain the disks within the blank 10. Disks 16, 17 and 18 represent only three of the many possible patterns that could be used to cut the perimeter of a disk while still maintaining its connection to the blank 10. However, it should be noted that although FIG. 1A depicts several different methods of connection being used on a single blank, all of the disks on a single blank would preferably be formed using the same technique.

In the above examples, the creation of the circular openings at the center of each disk and the removal of substrate material at the outer perimeter of each disk can be performed by any of the customary machine-shop practices, such as multiple head milling, press punching, drilling, or comparable means. Alternatively, the processes can be accomplished by laser cutting, water jet cutting, chemical etching, numerically controlled scoring or similar means.

Figure 2:
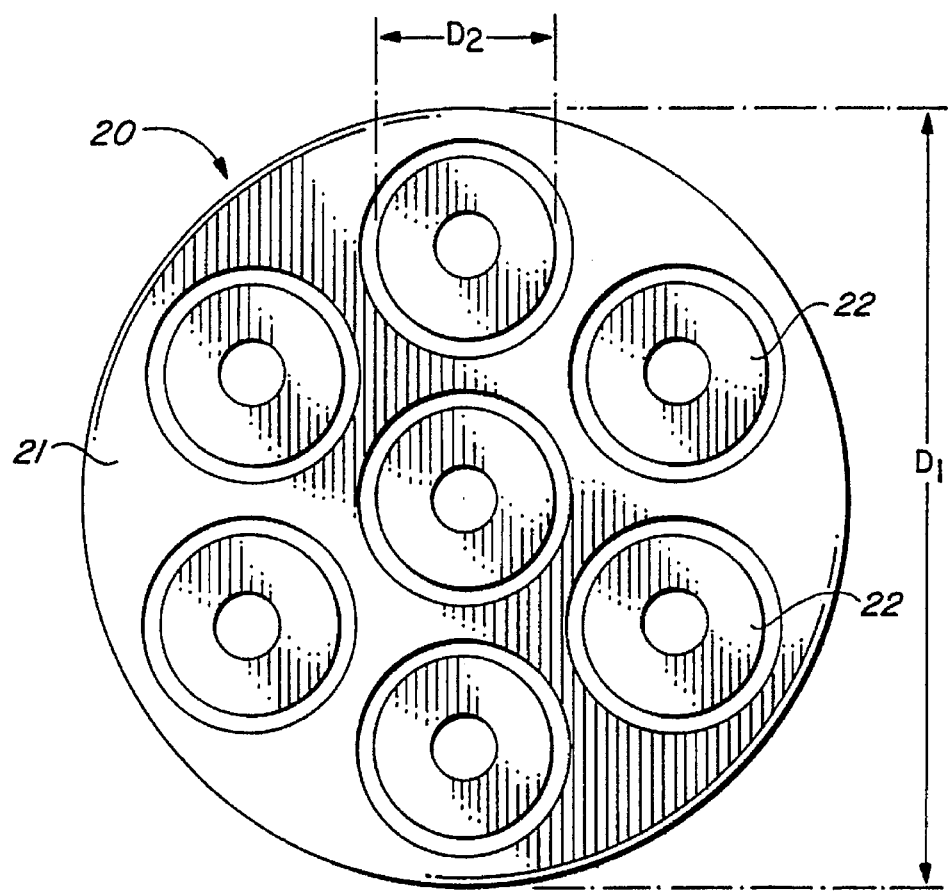
FIG. 2 is a plan view of another embodiment of the invention in which the blank can be processed in a conventional single-disk tool.

Turning now to FIG. 2, another embodiment of the invention is illustrated. In this embodiment the blank 20 is a disk of diameter $D_1$ formed from an aluminum substrate 21. The blank 20 has formed within it a plurality of smaller disks 22 of diameter $D_2$. The smaller disks are fabricated using any of the techniques described above with reference to the rectangular blank 10. A disk shaped blank has the significant advantage of being usable in conventional sputtering equipment designed to fabricate disks of diameter $D_1$. Therefore, equipment and tooling used to create previous generations of larger diameter disks can be used, without modification, to fabricate the new smaller diameter disks. In addition, the diameter $D_1$ of the blank 20 can be made slightly larger than the disks originally fabricated. For example, some tooling originally designed to accommodate 130 mm. disks can also accommodate 135 mm. disks. By slightly increasing the diameter of the blank 20 to 135 mm., five 48 mm. disks can be formed instead of the four disks that would fit on a 130 mm. blank.

Figure 3:
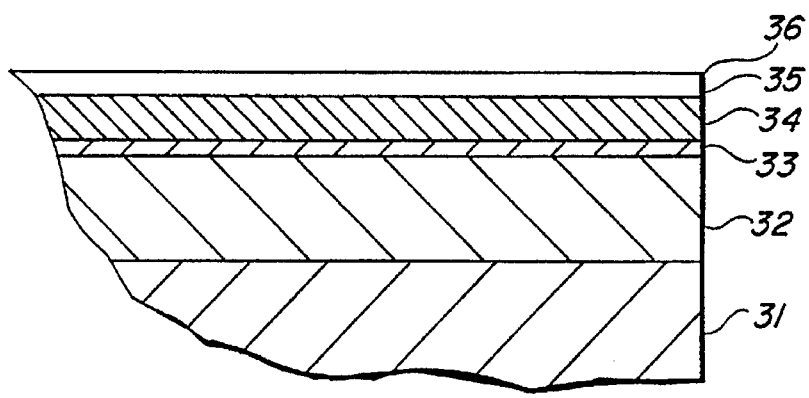
FIG. 3 is a cross-sectional representation of the blank after the thin film layers have been applied.

Turning now to the thin films deposited on the blank, FIG. 3. shows a section view of the thin film layers of the present invention. As in substantially all rigid disk products, the disk is typically formed from an aluminum alloy substrate 31. In a disk having a 130 mm. outside diameter the substrate typically has a thickness of approximately 1.9 mm. The initial layer overlying the substrate is a deposit of hard nickel-phosphorous (NiP) 32 which is electroless plated over the aluminum surface. The surface thus provided is equivalent in hardness to carbon steel (600 kg./sq. mm.) and serves as a firm base for the very thin and fragile magnetic layer. In addition, the NiP coating can be polished so as to create a very smooth and controlled surface finish that a soft aluminum surface alone could not provide. The final disk surface must be free of irregularities so as to minimize head/disk interactions that can accelerate disk wear.

The NiP coated substrate is first polished to a high degree of smoothness (40 angstroms RMS). Optionally, a texture may be imparted to the surface (65 angstroms RMS measured radially) which serves to reduce static friction at the head-disk interface. Even with the added surface texture, the resultant disk surface roughness still allows a recording head to fly at seven microinches at the inner diameter without encountering interference or interactions.

Following the preparation of the NiP surface, an underlayer 33, such as chromium, a ferromagnetic cobalt alloy magnetic layer 34, and a protective overcoat 35, such as hydrogenated carbon, are sequentially applied by sputter deposition. After emerging from the sputtering step, a lubricant monolayer is deposited on the disk surface 36.

Although the advantages of the present invention have been described in the context of sputtering processes, it would occur to one skilled in the art that the described blanks would also have advantages in other stages of the disk fabrication process. As one example, the disks could remain in the blank during the application of the lubricant monolayer. Just as the use of the blank increases the throughput of the sputtering operations, it would increase the throughput of the lubricant application step. Just as with the sputtering process, several disks would be processed in the amount of time required to process a single larger disk using conventional means. Similarly, it should be apparent that other modifications and adaptations of the described embodiments may occur to one skilled in the art without departing from the scope of the present invention as set forth in the following claims.

We claim:

1. A blank for forming a plurality of magnetic storage disks comprising:

an aluminum alloy substrate having a plurality of holes;

a plurality of disks formed in the substrate, each disk being formed about a respective one of the plurality of holes and defined by a removed portion of the substrate material around the outer perimeter thereof, the disks being maintained in the substrate by remaining portions of the substrate material present at the outer perimeter;

a film of nickel-phosphorous formed over the substrate; and a magnetic layer formed over the film of nickel-phosphorous.

2. The blank according to claim 1 wherein a protective overcoat is formed over the magnetic layer.

3. The blank according to claim 2 wherein a lubricant layer is formed over the protective overcoat.

4. A blank for forming a plurality of magnetic storage disks comprising:

an aluminum alloy substrate having a plurality of holes disposed near the periphery of the substrate and in the inner portion of the substrate;

a plurality of disks formed in the substrate, each disk being formed about a respective one of the plurality of holes and defined by a removed portion of the substrate material around the perimeter thereof, the disks being maintained in the substrate by remaining portions of the substrate material present at the outer perimeter;

a film of nickel-phosphorous formed over the substrate; and a magnetic layer formed over the film of nickel-phosphorous.

5. The blank according to claim 4 wherein a protective overcoat is formed over the magnetic layer.

* * * * *